United States Patent [19]

Bush

[11] 4,021,089
[45] May 3, 1977

[54] KNOCK DOWN MODULAR UNIT AND ASSEMBLIES THEREOF

[76] Inventor: Paul S. Bush, c/o Bush Brothers Products Corp., 312 Fair Oak St., Little Valley, N.Y. 14755

[22] Filed: Jan. 15, 1976

[21] Appl. No.: 649,551

[52] U.S. Cl. .................. 312/257 R; 312/111; 312/263; 52/79.9
[51] Int. Cl.² .................. F16B 12/00; A47B 43/00
[58] Field of Search ............ 312/257 R, 263, 111, 312/108; 52/753 C, 753 D, 753 J

[56] References Cited

UNITED STATES PATENTS

| | | | |
|---|---|---|---|
| 2,926,978 | 3/1960 | Mitchell | 312/108 |
| 3,153,299 | 10/1964 | Jennings | 52/753 D X |
| 3,353,888 | 11/1967 | Pritelli, Jr. | 312/257 R |
| 3,751,127 | 8/1973 | Black, Jr. et al. | 312/111 X |
| 3,778,175 | 12/1973 | Zimmer | 52/753 C X |
| 3,820,299 | 6/1974 | Verholt | 312/257 R X |
| 3,841,726 | 10/1974 | Andros et al. | 312/111 X |
| 3,874,753 | 4/1975 | Naito et al. | 312/263 |
| 3,876,270 | 4/1975 | White | 312/257 R X |
| 3,945,696 | 3/1976 | Yellin | 312/257 R X |

Primary Examiner—Paul R. Gilliam
Assistant Examiner—Victor N. Sakran
Attorney, Agent, or Firm—Webb, Burden, Robinson & Webb

[57] ABSTRACT

A modular unit and an assembly of modular units of "knock down" construction includes means for joining the components to form a stable construction having a "finished look." The components include projections which interengage frictionally. A unit or assembly of units may be open or closed and may be wall mounted or free standing.

13 Claims, 27 Drawing Figures

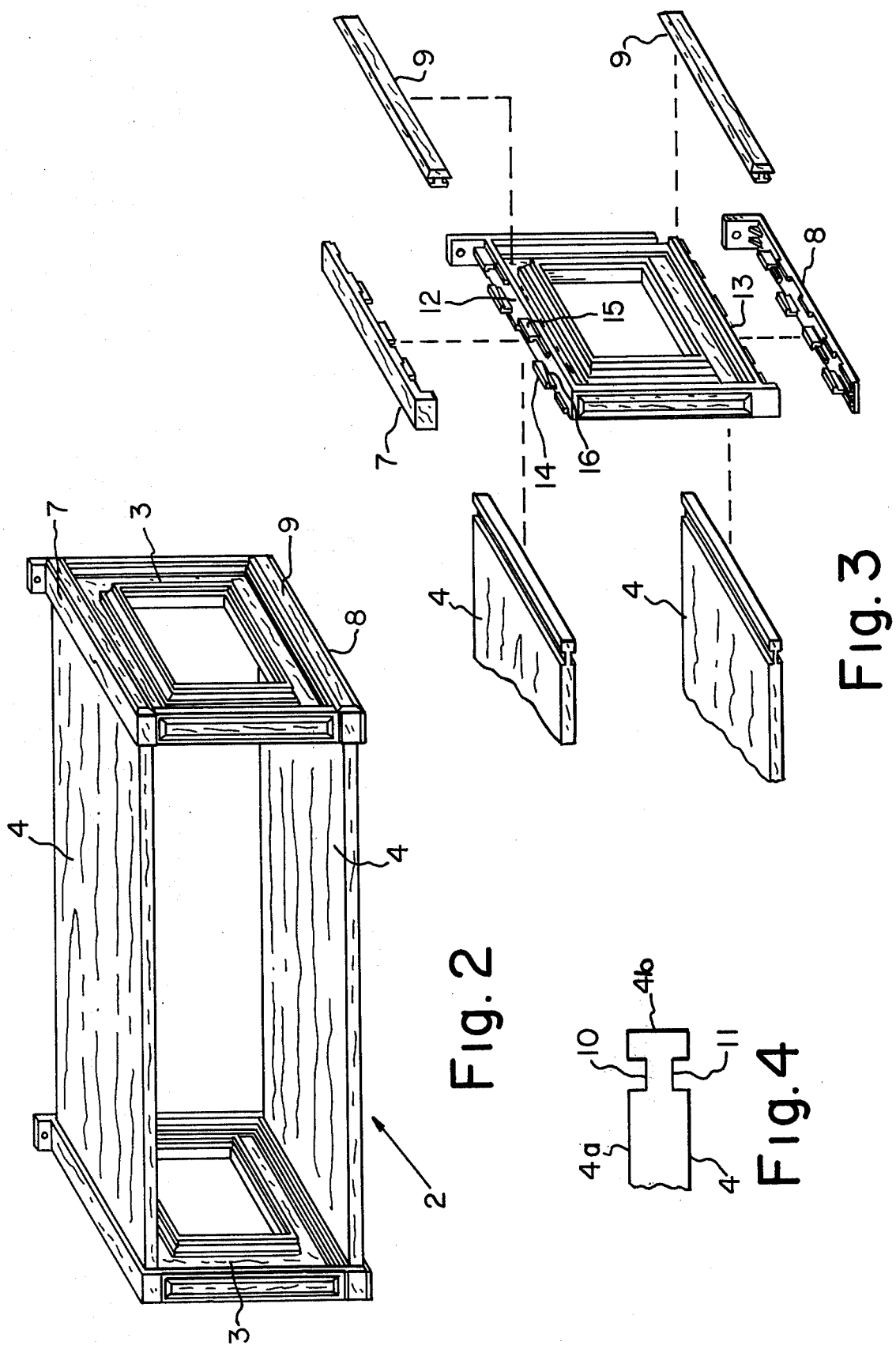

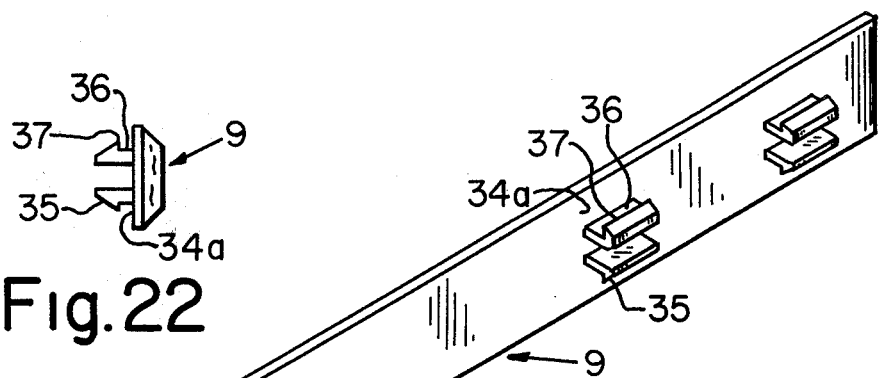
Fig. 22
Fig. 23
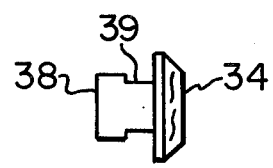
Fig. 24
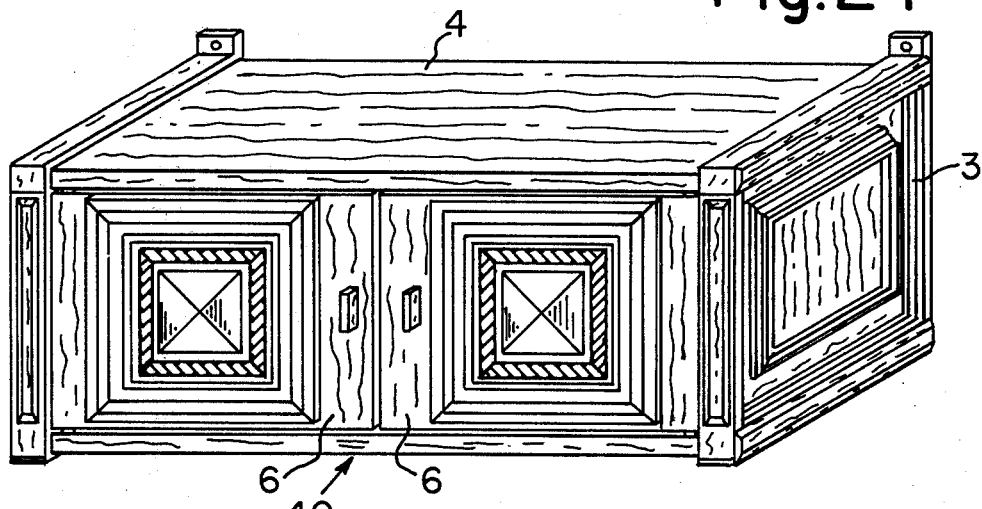
Fig. 26
Fig. 25
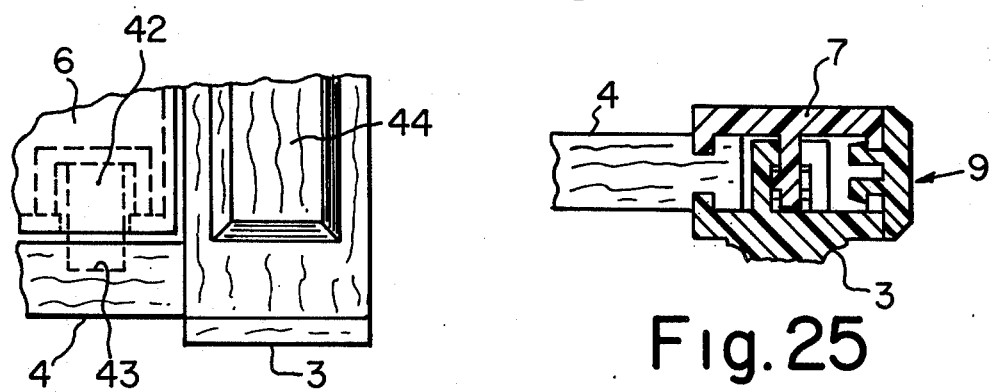
Fig. 27

KNOCK DOWN MODULAR UNIT AND ASSEMBLIES THEREOF

FIELD OF THE INVENTION

This application relates to modular construction and particularly to modular units which are adapted to be joined or interconnected by an improved construction to provide wide varieties in assemblies. The invention is especially applicable to articles generally known as "KD" or knock down assemblies such as shelving, cabinets and the like.

BACKGROUND OF THE INVENTION

The term knock down is used to describe an assembly comprised of components which are packaged and shipped in unassembled form for assembly by the ultimate purchaser. The advantages of this type of assembly are the substantial reduction in the size of the packaging required with the consequent savings in storage or freight costs and the elimination of the labor costs involved in the final assembly. A disadvantage, however, of many forms of knock down assemblies is that the components cannot be assembled by the purchaser in a manner which achieves a rigid, stable construction having an attractive appearance or finished look.

May attempts have been made to overcome this disadvantage. Knock down assemblies have been made utilizing keys, wedges, mechanical fasteners, and the like to join the components together. None provides the simplicity of assembly nor offers the versatility and "finished" attractiveness of the modular units and assemblies made in accordance with the present invention.

An important feature of the present invention is the provision of an improved means for releasably interconnecting the components of the knock down modular units and assemblies of units to form a rigid, stable construction without the use of mechanical fasteners such as screws or the like. The interconnecting means permits development of a considerable number of units and assemblies sufficient to meet the needs of any purchaser.

SUMMARY OF THE INVENTION

The present invention is addressed to modular units having means for interconnecting similar or disparate components to provide a stable unit and an assembly of such units in the form of shelving, cabinets or the like. The means for interconnecting the components comprises an edge surface construction on components to be assembled which is adapted for interlocking engagement with a cooperating edge surface construction on other of the components to releasably secure one component to another. In the principal components of the modular units, one edge surface construction comprises a plurality of L-shaped projections which interengage, in assembly, with an edge surface construction comprising a plurality of cooperating projections forming the edge surface construction on another component. The projections include tapered portions and are spaced from one aother along an edge surface of a component. The components are assembled into a modular unit and the units are joined to form an assembly by joining the projections, as will be described in detail hereinafter, to cause interengaging projections to contact each other along the length of their tapered portions, respectively, to provide a tight frictional engagement between them, resisting separation of the components.

Other edge surface constructions are provided on auxiliary components for interengagement with the principal type described above. Among these auxiliary components are top rails, bottom rails and side rails and the like which are employed to complete a modular unit or assembly of units to provide a finished look in the final product.

The invention is described in detail hereinafter with respect to use of molded plastic components and wood shelves or panels which are joined to form modular units and assemblies of modular units, such as shelving. It should be understood, however, that the principles of the invention are applicable to the construction regardless of the material from which the components are made where it is desirable to form such units, assemblies, and their equivalents as set forth in the drawings, the detailed description and the claims hereof.

DETAILED DESCRIPTION OF THE DRAWINGS

The structure and features of the invention will be appreciated from the following detailed description taken in conjunction with the accompanying drawings in which:

FIG. 2 is a perspective view of a basic modular unit made in accordance with the principles of the invention;

FIG. 3 is an exploded view showing the components comprising one end of the unit of FIG. 2;

FIG. 4 is a partial view of a shelf for the unit;

FIG. 22 is a end view of a side rail according to one embodiment of the invention taken along lines XXII—XXII of FIG. 20;

FIG. 23 is an end view of a side rail according to a second embodiment of the invention similar to FIG. 22;

FIG. 24 is an isometric view of the side rail of FIGS. 20-22;

FIG. 25 is a partial cross-sectional view of a connection between a shelf, end bracket, top rail, and side rail;

FIG. 26 is a perspective view of another embodiment of the unit made in accordance with the principles of the invention; and FIG. 27 is a partial cross-sectional view of a corner construction in a modular unit of the type shown in FIG. 26.

In the drawings, the same reference numerals are used to designate the same elements in each of the figures.

DETAILED DESCRIPTION OF THE INVENTION

Figure 1:
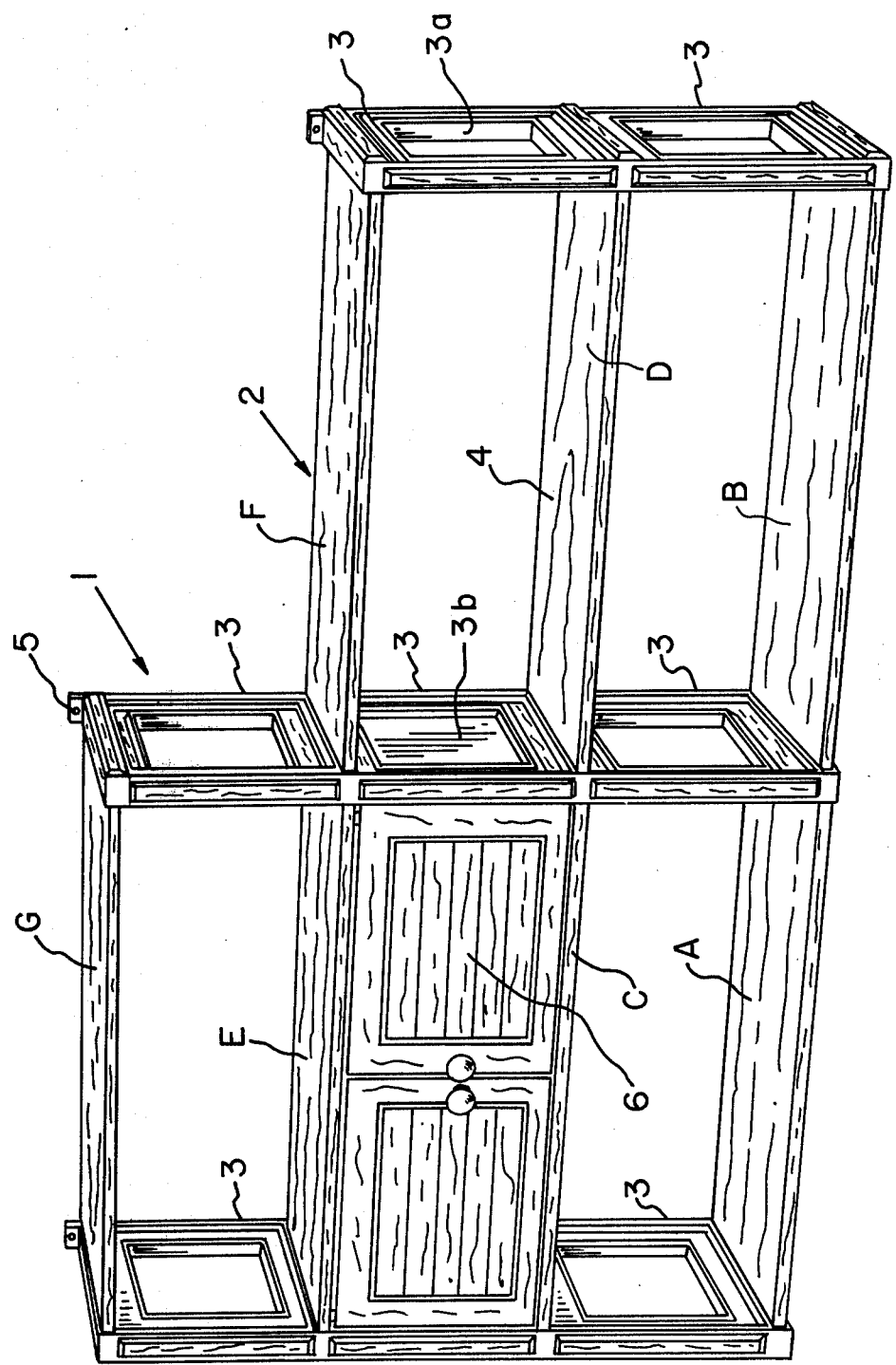
FIG. 1 is a perspective view of an assembly of modular units made in accordance with the principles of the invention.
Figure 5:
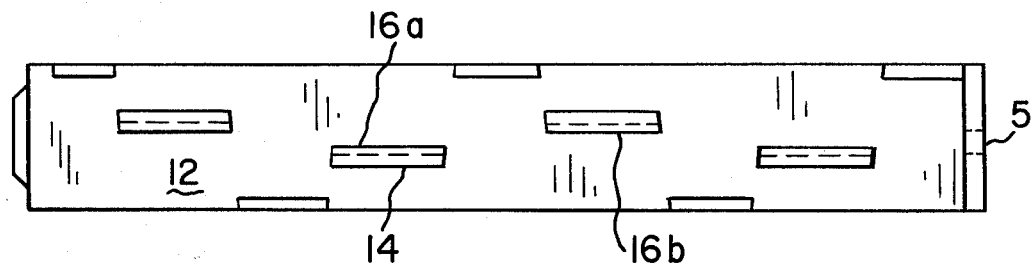
FIG. 5 is a top plan view of an end bracket.
Figure 6:
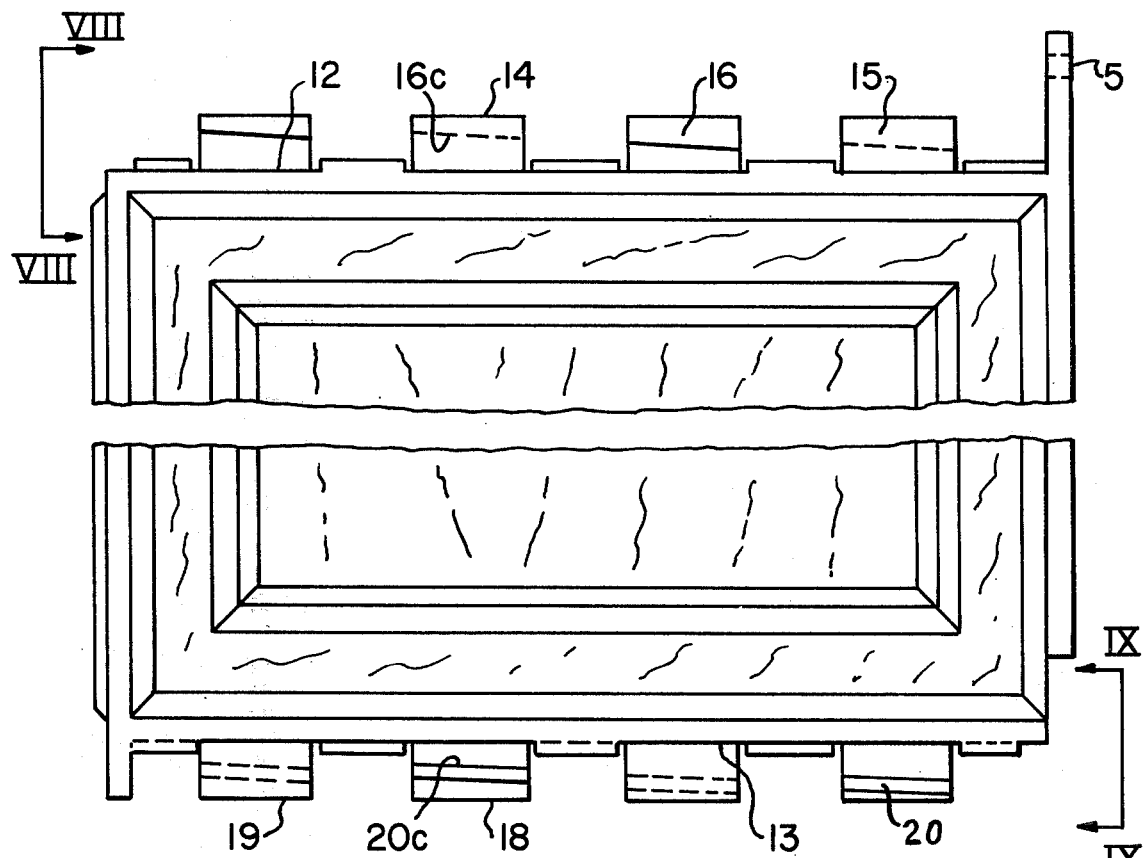
FIG. 6 is an elevational view of the end bracket of FIG. 5.
Figure 7:
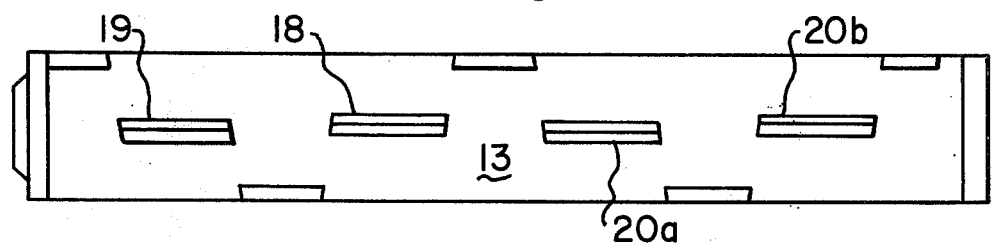
FIG. 7 is a bottom plan view of the end bracket of FIG. 5.
Figure 8:
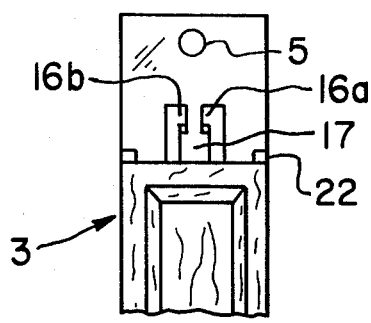
FIG. 8 is an end view of the top portion of the end bracket of FIG. 5 taken along lines VIII—VIII of FIG. 6.
Figure 10:
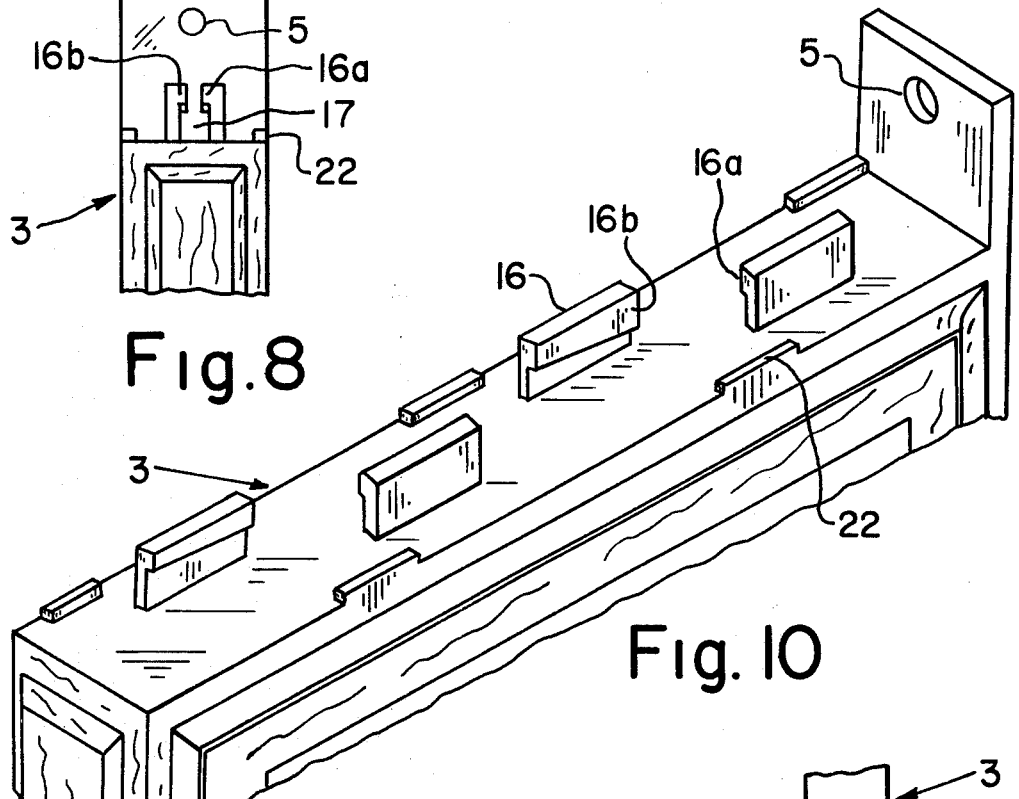
FIG. 10 is a perspective view of the top portion of the end bracket of FIGS. 5-9.

Referring to the drawings, FIG. 1 shows a knock down shelving assembly 1 comprising a plurality of modular units 2 having improved means for interconnecting them. Each unit includes end brackets 3 and panels or shelves 4. The modular units may be arranged as shown and suspended from a wall by fasteners inserted through holes 5 or the units may be free standing. The central portion of the end brackets 3 may be open (e.g. 3a) or closed (e.g. 3b) and the front of each modular unit may be open or it may be closed by a closure, such as doors 6.

As shown in FIGS. 2 and 3, a typical basic modular unit 2 in accordance with the invention comprises two end brackets 3 and two shelves 4. The end brackets and shelves may be interconnected by top rail members 7 and bottom rail members 8 and provided with side rail members 9 which give the unit a finished look. Each shelf 4 has, at each end, a pair of grooves 10, 11 (FIG. 4), one in each surface 4a. The grooves extend parallel to and are spaced from the end 4b of the shelf.

Each end bracket (FIGS. 5-11) has a top edge surface 12 and a bottom edge surface 13. A plurality of L-shaped projections 14 are positioned along the top edge surface 12. Each projection has a leg portion 15 extending vertically from edge surface 12 and a foot portion 16 extending substantially horizontally to the leg portion and spaced from the edge surface 12.

Preferably, one half of the projections on edge surface 12 include a foot portion (e.g. 16a which is disposed oppositely from the foot portions (e.g. 16b) of the remaining projections on the same edge surface. Alternate projections are also laterally spaced from one another to provide, when the projections are viewed along the edge surface (as in FIG. 8), a space 17 having an inverted T-shaped cross section. Each foot portion 16 of each projection 14 also has a surface 16c facing the edge surface 12 which is tapered, preferably at an angle of about 3° with respect to the edge, for contacting, in a manner to be described, an interengaging projection of another component of the modular unit, such as another end bracket or a top rail member.

There are a plurality of L-shaped projections 18 on the bottom edge surface 13 of the end bracket 3. The projections have a vertical leg portion 19 and a substantially horizontal foot portion 20, a surface 20c of which faces the edge surface 13 and is tapered at the same angle as the foot portions 16c of the projections 14 along edge surface 12. The vertical leg portions 19 are substantially aligned with one another along edge surface 13 and the foot portions 20 of alternate projections are oppositely disposed (e.g. 20a, 20b). When viewed along the edge surface (as in FIG. 9), the projections 18 appear to form a member 21 having an inverted T-shaped cross section. Each end bracket 3 is provided with such edge surface constructions. Therefore, the end brackets 3 can be joined together by interconnecting an edge surface having what appears to form a member 21 having an inverted T-shaped cross section with an edge surface having a space 17 for receiving such a T-shaped cross section.

Although in the preferred embodiment of the invention shown in the drawings, aternate projections have their feet oppositely disposed, it should be understood that the invention is not limited to such perfectly alternate disposition of the projections or to a spacing of the projections as indicated. The invention will function equally satisfactorily with but a minimum of two projections on each side, where two of the projections have foot portions which extend in a direction opposite with respect to the centerline of the surface of the foot portions of the two projections. Similarly, the projections may be spaced closer together or farther apart than shown in the drawings along an edge surface of the end bracket provided there is some space between two projections having foot portions which extend the same direction toward the centerline of the surface so that the full effect of the coaction between the tapered foot positions of interengaging projections on the end brackets is achieved.

The panels or shelves 4 are connected to the end brackets 3 by means of members 22, 23 which are aligned along each side of edge surfaces 12 and 13, respectively. The grooves 10, 11 in the shelves are adapted to engage with these members and with similar members on a top rail member 7 or bottom rail member 8 interconnected wth the end bracket.

A typical top rail member 7 (FIGS. 12-15) comprises an L-shaped component having a base 24 and a leg 25 extending vertically at the end thereof. There are a plurality of L-shaped projections 26 extending along the base of the member 7, alternate projections having foot portions 27 which are oppositely disposed. It will be apparent to those skilled in the art that the projections 26 correspond to the construction previously described on the bottom edge surface 13 of the end bracket 3. The top rail member 7 also includes members 28 along opposite sides of the base 24 which are adapted to engage grooves 10, 11 in a shelf or shelves 4 or a side rail member 9. The leg 25 is provided to cover the otherwise exposed end 4b of the shelf to give the unit a finished look.

A typical bottom rail member 8 (FIGS. 16-19) is an L-shaped component comprising a base 29 and an upstanding leg 30 at the end thereof. L-shaped projections 31 extend along the base and correspond to the L-shaped projections on the top edge surface 12 of the end bracket 3. A plurality of members 32 extend along each side of the base and are also adapted for engagement with the grooves 10, 11 in a shelf 4 or with a side rail member 9. The leg 30 includes an opening 33 for a fastener (not shown). Side rail members 9 are provided to give the modular unit or an assembly of such units a finished look.

A typical side rail member 9 (FIGS. 20-23) comprises a base member 34 having at least two pairs of legs 35 extending outwardly therefrom. Each of the legs includes a notch 36 formed by a rear face 34a of the member and a shoulder 37 on a leg. Of course, more than two pairs of legs may be provided, as shown in the drawings. Another embodiment of a side rail is shown in FIG. 24. In this form there is a single leg 38 which may extend substantially the length of the base member 34 or may be interrupted along that length. There are also notches 39 in the leg 38. In either form of side rail the notches are adapted to engage the members 22, 23, 28 and 32 of an end bracket, top rail member and bottom rail member respectively, when the side rail member is used.

Having fully described a typical basic modular unit, those skilled in the art will appreciate versatility of the invention. As shown in FIG. 1, a plurality of modular units may be combined to form a finished assembly, such as a shelving unit for example. The bill of materials for such an assembly is extremely simple: seven panels or shelves, six open and two closed end brackets, three top rail members, three bottom rail members, eight side rail members, and two doors all joined by the improved means previously described in detail for interengaging all of the components of the modular unit. The assembly and installation of the shelving unit shown in FIG. 1, on a wall, may proceed as follows:

Three bottom rail members 8 are spaced appropriately and secured to a wall by suitable fasteners engaged through openings 33 in the rail members. The two bottom shelves 4 (hereinafter called A and B) are placed on the bottom rail members 8 such that the grooves 11 in the shelves fit over and engage the members 32 on the bottom rail members. The projections on the edge surface 13 of the middle end bracket 3 are then interengaged with the projections on the middle bottom rail member by axially joining them in a tight frictional fit. This interengagement will secure the inner ends of shelves A and B. Side rail members 9 are then placed on the outer two bottom rail members 8 with the notches 35 in the side rail members fitting over members 32 on the bottom rail members. End brackets 3 are interengaged with the projections on the other two bottom rail members as previously described to secure the side rail members and outer ends of the shelves A and B in the assembly. Additional shelves C and D are then placed on the top edge surfaces 12 of the end brackets 3 and the assembly procedure repeated. After the desired number of panels or shelves 4 (e.g. E, F, G) are assembled, a top rail member 7 is interengaged with the top edge surfce 12 of each uppermost end bracket 3 and the side rail member 9 (as shown in FIG. 25) and the basic assembly is complete.

Figure 9:
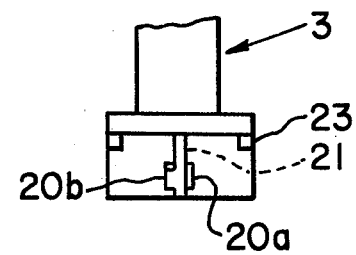
FIG. 9 is an end view of the bottom portion of the end bracket of FIG. 5 taken along lines IX—IX of FIG. 6.
Figure 11:
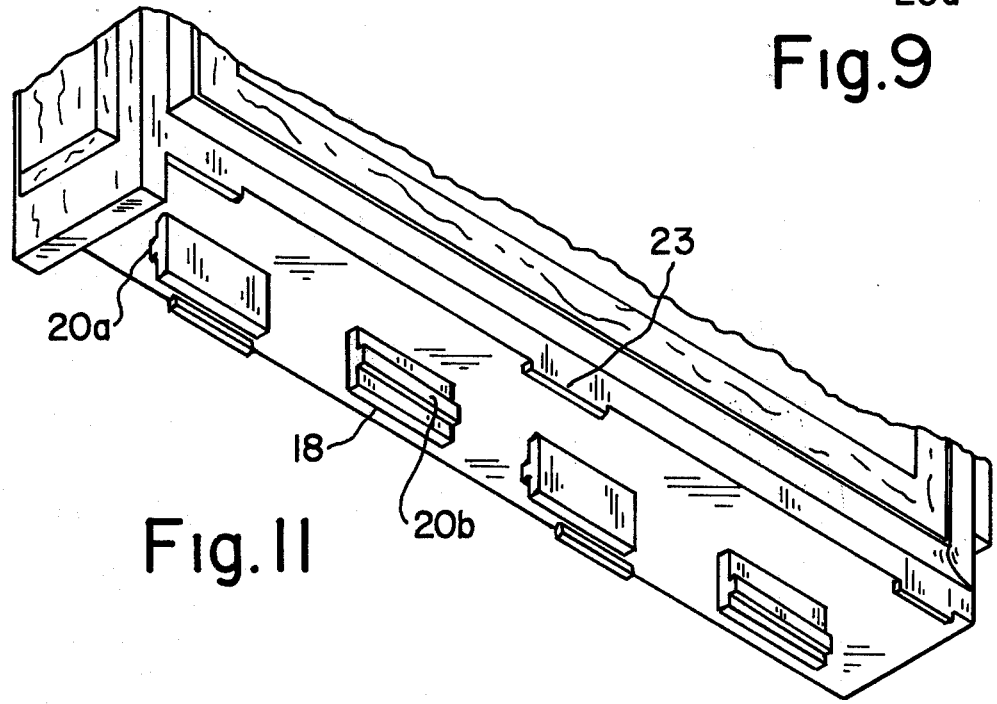
FIG. 11 is a perspective view of the bottom portion of the end bracket of FIGS. 5-9.
Figure 12:
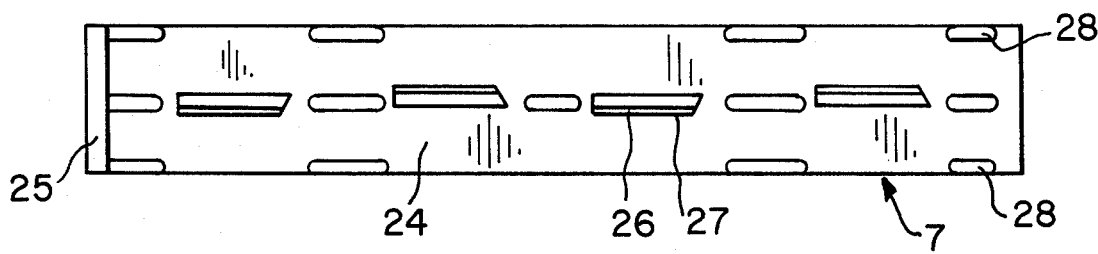
FIG. 12 is a bottom plan view of a top rail.
Figure 13:
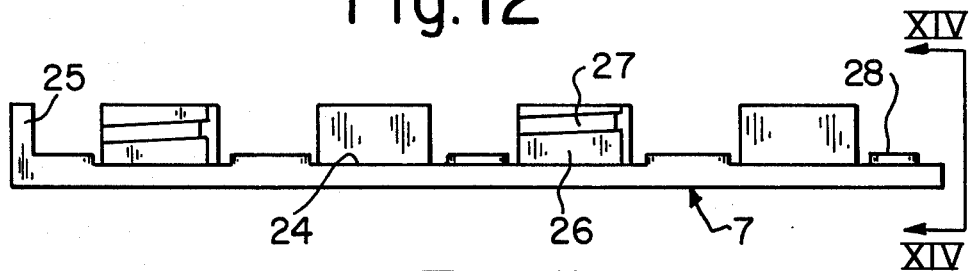
FIG. 13 is a side elevational view of the top rail of FIG. 12.
Figure 18:
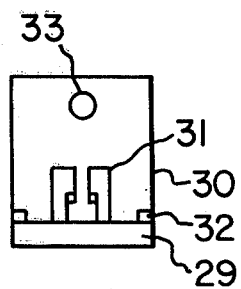
FIG. 18 is an end view of the bottom rail of FIG. 16 taken along the lines XVIII—XVIII of FIG. 17.
Figure 14:
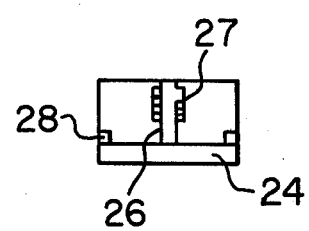
FIG. 14 is an end view of the top rail of FIG. 12 taken along lines XIV—XIV of FIG. 13.
Figure 15:
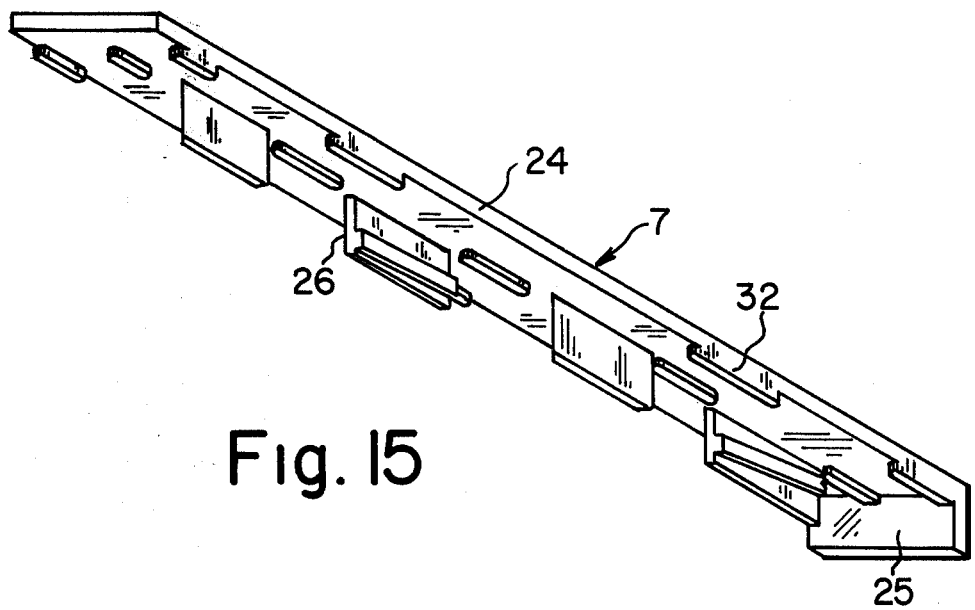
FIG. 15 is a perspective view of the top rail of FIGS. 12, 13, 14.
Figure 16:
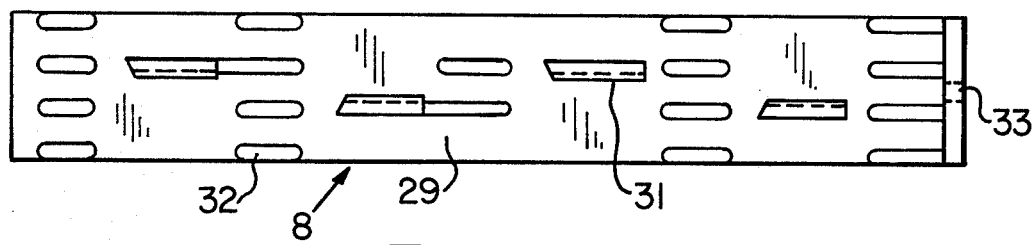
FIG. 16 is a top plan view of a bottom rail.
Figure 17:
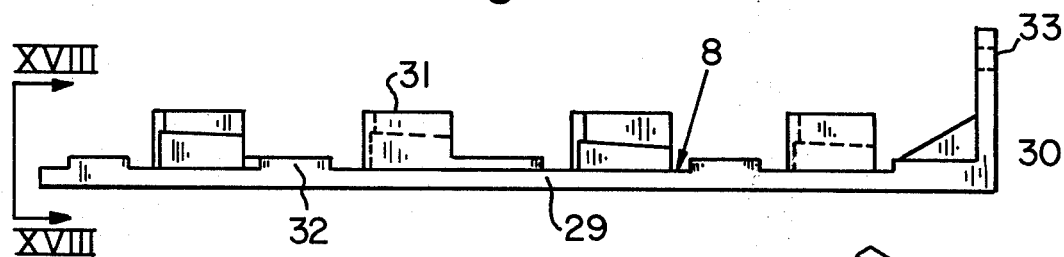
FIG. 17 is an elevational view of the bottom rail of FIG. 16.
Figure 19:
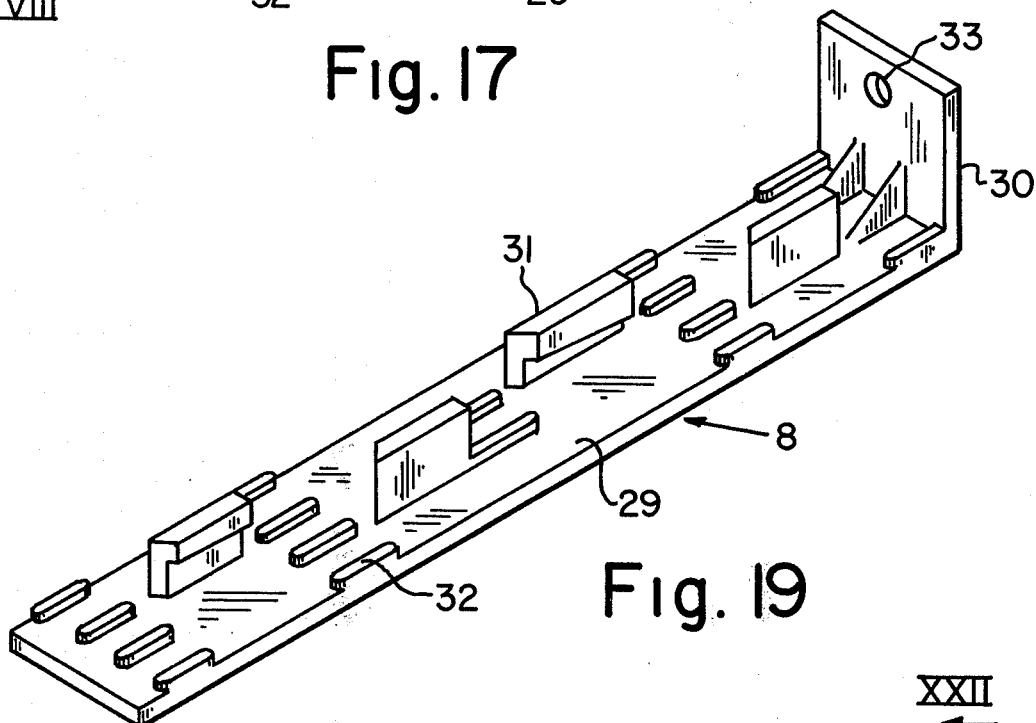
FIG. 19 is a perspective view of the bottom rail of FIGS. 16, 17, 18.
Figure 20:
FIG. 20 is a plan view of a side rail.
Figure 21:
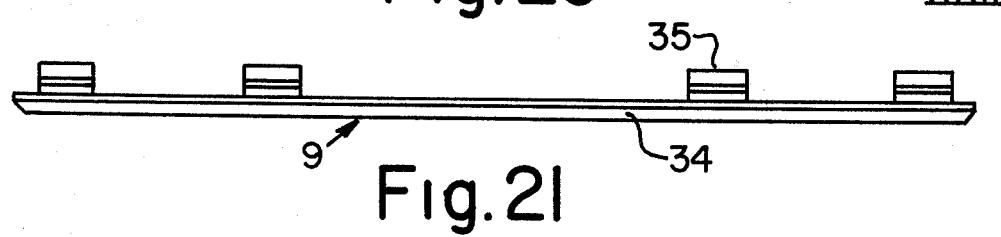
FIG. 21 is an elevational view of the side rail of FIG. 20.

The end brackets, top rail members and bottom rail members are interengaged or joined to one another by sliding the projections forming the T-shaped cross section, when viewed along the edge surface of the component carrying them (as shown in FIG. 9) longitudinally into the space 17 having a T-shaped cross section provided by the projections in the other component until the rear edges of the components are flush. As the projections are forced into engagement as described, the tapered foot portions of the projections on one component tightly engage the foot portions on the members on the other component. The taper of the surface of the foot portions is relatively slight (preferably about 3° with respect to the plane of the end bracket edge surface facing the taper) and the material (particularly molded plastic) gives slightly as the projections engage. In the final assembly, the tapered portions tightly contact in a frictional engagement providing a substantial, stable assembly in the form of shelving, cabinets or the like.

If, as shown in FIGS. 1 and 26, it is desired to close one or more of the modular units, a closure 40 (see FIG. 26) comprising a pair of pivotally mounted doors 6 may be provided. The doors may be hinged in any convenient manner, such as that shown in FIG. 27. The bottom edge 41 of a door 6 includes a hinge pin 42 which is adapted to fit in a hole 43 formed in the panel or shelf 4. A similar hinge pin and hole are provided at the top of the door and in the panel or shelf immediately above (not shown), respectively. Thus, the doors are free to pivot on the pins for opening and closing. Conventional means, such as magnetic catches may be used to hold the doors closed. In order to keep the closed unit free of dust, the central portion of the end brackets of the modular unit may be closed by a center panel 44. The doors may be provided with any artistic decor desired.

Having described preferred embodiments of the invention, it should be understood that it may be otherwise embodied within the scope of the appended claims.

I claim:

1. Means for connecting two components suitable for use in a modular unit in which the components are interengaged along adjacent surfaces, said means comprising:
    A. a plurality of first and second L-shaped projections aligned on a surface of a first component, a leg of each projection extending from the surface of the component and a foot portion of each projection extending laterally of the leg, a tapered surface on the foot portion facing the surface, the legs of the first projections being spaced laterally on the surface from the legs of the second projections on the surface and the foot portions of said first projections being directed opposite to and toward the foot portions of said second projections; and
    B. a plurality of first and second L-shaped projections aligned on a surface of a second component, a leg of each projection extending from the surface of said second component and a foot portion of each projection extending laterally of the leg, a tapered surface on the foot portion facing said surface, the legs of the projections being in substantial alignment with each other and the foot portions of the first projections being directed opposite to and away from the foot portions of said second projections, the legs on the projections on the surface of said first component being spaced sufficiently laterally to admit the foot portions of the projections on the surface of said second component and the foot portions of the projections on the surface of the first component being spaced sufficiently to admit the legs of the projections on the surface of said second component, the tapered surfaces of said projections on the surface of the first component being adapted to frictionally engage the tapered surfaces of the projections on the surface of said second component.

2. Means as set forth in claim 1 in which the angle of the tapered surface is about 3° with respect to the surface of a component.

3. Means for connecting at least two components suitable for use in a modular unit along adjacent surfaces of the components comprising:
    A. on a first component, a plurality of longitudinally spaced projections in transversely spaced alignments along the surface, each projection having a leg portion and a foot portion having a tapered surface facing the surface of the component, the foot portions of the transversely spaced projections being directed toward the longitudinal centerline of the surface; and B. on a second component, a plurality of longitudinally spaced projections having leg portions in longitudinal alignment along the surface and foot portions extending from the centerline of the surface, each foot portion having a tapered surface facing the surface of the second component whereby the two components will interengage when the tapered surfaces of the projections on the first and second components are brought into contact by sliding one component longitudinally with respect to the other.

4. A modular unit including a plurality of components connected to one another to form a four-sided unit comprising:
A. a pair of spaced end brackets, each having top and bottom edge surfaces having projections thereon;
B. a pair of panels, one extending between the top edge surfaces of the end brackets and the other extending between the bottom edge surfaces of the end brackets;
C. a groove in each surface adjacent each end of each panel;
D. means on the top and bottom edge surfaces of each bracket for engaging a groove on a panel; and
E. means adapted to interengage with the projections for securing the engaging means in a groove.

5. A modular unit as set forth in claim 4 wherein the securing means comprises a rail member having a surface including a plurality of longitudinally spaced projections having leg portions in substantially longitudinal alignment along an edge surface of the end bracket and foot portions extending outwardly from said leg portions away from the centerline of the surface, each foot portion having a tapered surface facing the edge surface of the end bracket and top edge surface of the end bracket having a plurality of longitudinally spaced projections in transversely spaced alignments along the surface, each projection having a leg portion and a foot portion having a tapered surface facing the edge surface of the bracket, the foot portions of the transversely spaced projections being directed toward the longitudinal centerline of the edge surface whereby the rail member projections will interengage with the edge surface projections of the end bracket when the tapered surfaces of the projections on each are brought into contact by sliding the rail member longitudinally with respect to the bracket.

6. A modular unit as set forth in claim 4 wherein the securing means comprises a rail member having a surface including a plurality of longitudinally spaced projections having leg portions in transversely spaced alignments along the surface, each projection having a leg portion and a foot portion having a tapered surface facing the surface of the rail member, the foot portions of the transversely spaced projections being directed toward the longitudinal centerline of the surface and the edge surface of the bracket having a plurality of longitudinally spaced projections having leg portions in substantial longitudinal alignment along the edge surface and foot portions extending from said leg portions away from said centerline of the edge surface, each foot portion having a tapered surface facing the edge surface whereby the rail member projections will interengage with the edge surface projections of the end bracket when the tapered surfaces on each are brought into contact by sliding the rail member longitudinally with respect to the end bracket.

7. A modular unit as set forth in claim 4 and including at least one rail member having means for engaging the means on one of the edge surfaces of the end bracket and for engaging the means for securing the engaging means in a groove.

8. A modular unit as set forth in claim 4 and including a closure hingedly secured to the panels and adapted to close the front of the unit formed by the end brackets and the panels.

9. A modular unit as set forth in claim 8 in which the closure comprises a pair of doors which are adapted to close together, each door being pivotally mounted on pins extending into edge surfaces of the door and one of the panels.

10. A modular unit comprising:
A. a pair of end brackets, each end bracket having means on opposite edge surfaces for connecting laterally extending panels thereto and having projections thereon;
B. a pair of panels, each panel having means on opposite ends thereof for connection to said means on said end brackets;
c. the means on each end of the panels comprising a pair of grooves, one in each surface of the panel and parallel to an end thereof and the means on each bracket edge surface comprising a member which is adapted to fit into a groove; and
D. means adapted to interengage with the projections for securing the member in the groove whereby the assembled unit has a substantially rectangular shape.

11. An assembly including a plurality of components connected to one another to form a plurality of four-sided modular units having at least one common component, said assembly comprising at least three end brackets and two pairs of panels, one pair of panels extending between top and bottom edge surfaces of a first end bracket and a second end bracket and the other pair of panels extending between top and bottom surfaces of the second end bracket and a third end bracket, a groove in each surface at each end of each panel, means on the top and bottom edge surfaces of each bracket for engaging a groove on a panel and projections on the top and bottom edge surfaces of each bracket and means adapted to interengage with the projections for securing the engaging means in a groove.

12. An assembly of modular units comprising:
A. a plurality of end brackets, each end bracket having means on opposite edge surfaces for connecting laterally extending panels thereto and projections for connecting end brackets to each other;
B. a plurality of panels, each panel having means on opposite ends thereof for connection to said means on said end brackets;
C. the means on each end of a panel comprising a pair of grooves, one in each surface of the panel, and the means on each bracket edge surface comprising a member which is adapted to fit into a groove; and
D. means adapted to interengage with the projections for securing each member in a groove.

13. An assembly of modular units as set forth in claim 12 wherein the means for securing each member in a groove comprises one of an end bracket, top and bottom rail member.

* * * * *